United States Patent
Yofu

(10) Patent No.: US 9,714,353 B2
(45) Date of Patent: Jul. 25, 2017

(54) INK COMPOSITION, INK SET, AND IMAGE FORMATION METHOD

(71) Applicant: FUJIFILM Corporation, Tokyo (JP)

(72) Inventor: Katsuyuki Yofu, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/828,223

(22) Filed: Aug. 17, 2015

(65) Prior Publication Data
US 2015/0353748 A1    Dec. 10, 2015

Related U.S. Application Data

(63) Continuation of application No. PCT/JP2014/056132, filed on Mar. 10, 2014.

(30) Foreign Application Priority Data

Mar. 22, 2013 (JP) ................................ 2013-061110

(51) Int. Cl.
| | |
|---|---|
| C09D 11/107 | (2014.01) |
| B41J 11/00 | (2006.01) |
| C09D 11/30 | (2014.01) |
| C09D 11/101 | (2014.01) |
| C09D 11/322 | (2014.01) |
| C09D 11/40 | (2014.01) |
| C09D 11/38 | (2014.01) |
| B41M 5/00 | (2006.01) |
| B41M 7/00 | (2006.01) |

(52) U.S. Cl.
CPC ......... *C09D 11/107* (2013.01); *B41J 11/0015* (2013.01); *C09D 11/101* (2013.01); *C09D 11/30* (2013.01); *C09D 11/322* (2013.01); *C09D 11/38* (2013.01); *C09D 11/40* (2013.01); *B41M 5/0017* (2013.01); *B41M 7/0018* (2013.01)

(58) Field of Classification Search
CPC .............................. C09D 11/101; C09D 11/30
See application file for complete search history.

(56) References Cited

U.S. PATENT DOCUMENTS

| | | | | |
|---|---|---|---|---|
| 4,594,310 A | * | 6/1986 | Nagasaka | C08F 2/50 430/281.1 |
| 5,296,577 A | * | 3/1994 | Tamura | C08F 20/56 526/218.1 |
| 2007/0035599 A1 | | 2/2007 | Satoh et al. | |
| 2010/0080913 A1 | * | 4/2010 | Irita | C09D 11/101 427/258 |

FOREIGN PATENT DOCUMENTS

| | | |
|---|---|---|
| JP | 2000-218929 A | 8/2000 |
| JP | 2001-270236 A | 10/2001 |
| JP | 2005-120226 A | 5/2005 |
| JP | 2005-350551 A | 12/2005 |
| JP | 20007-045066 A | 2/2007 |
| JP | 2012-102242 A | 5/2012 |
| JP | 2012-167246 A | 9/2012 |

OTHER PUBLICATIONS

International Search Report for PCT/JP2014/056132 dated Jun. 3, 2014.
The extended European search report issued by the European Patent Office on Feb. 23, 2016, which corresponds to European Patent Application No. 14767328.9-1302 and is related to U.S. Appl. No. 14/828,223.

* cited by examiner

*Primary Examiner* — An Do
*Assistant Examiner* — Renee I Wilson
(74) *Attorney, Agent, or Firm* — Studebaker & Brackett PC

(57) ABSTRACT

An ink composition contains the following (A) to (D): (A) a polymerizable compound having an ethylenically unsaturated group, (B) a photopolymerization initiator other than a photopolymerization initiator having a biimidazole structure, (C) water, and (D) a chain transfer agent precursor represented by the following Formula (1).

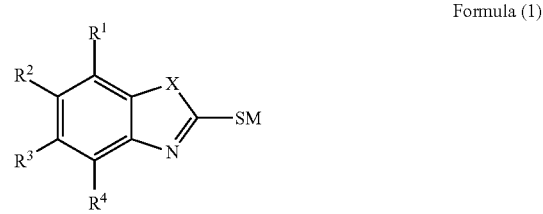

Formula (1)

In Formula (1), each of $R^1$ to $R^4$ represents a hydrogen atom or a substituent; X represents an oxygen atom or a sulfur atom; and M represents an alkali metal.

7 Claims, No Drawings

INK COMPOSITION, INK SET, AND IMAGE FORMATION METHOD

CROSS-REFERENCE TO RELATED APPLICATIONS

This application is a Continuation of PCT International Application No. PCT/JP2014/056132 filed on Mar. 10, 2014, which claims priority under 35 U.S.C §119(a) to Japanese Patent Application No. 2013-061110 filed on Mar. 22, 2013. Each of the above application(s) is hereby expressly incorporated by reference, in its entirety, into the present application.

BACKGROUND OF THE INVENTION

1. Field of the Invention

The present invention relates to an ink composition, an ink set, and an image forming method.

2. Description of the Related Art

As image recording methods in which an image is formed on a recording medium such as paper based on an image data signal, there are an electrophotographic method, a sublimation-type and fusion-type thermal transfer method, an ink jet method, and the like.

In the ink jet method, a plate is not required at the time of printing, and an image is directly formed on a recording medium by ejecting an ink composition only to a necessary image portion. Therefore, the ink composition can be used with excellent efficiency, and the running cost becomes low. Furthermore, the ink jet method uses an inexpensive printing device and generates little noise. As described above, the ink jet method has more various advantages than other image recording methods.

As an ink composition used in the ink jet method, a radiation-curable ink composition is known. The radiation-curable ink composition is cured when polymerizable components in the ink composition are polymerized by being irradiated with radiation such as ultraviolet rays. Consequently, blurring of an image barely occurs compared to a case of using a non-radiation-curable ink composition (a solvent-based ink composition), and this is one of the advantageous of the radiation-curable ink composition.

SUMMARY OF THE INVENTION

An object of the present invention is to provide a photopolymerizable ink composition which is preferable when being used in an image recording method using an ink jet method and exhibits higher photopolymerization efficiency under a specific condition.

Another object of the present invention is to provide an ink set constituted with the aforementioned ink composition and a treatment agent which is for creating the aforementioned specific condition.

Another object of the present invention is to provide an image forming method using the aforementioned ink composition or ink set.

In order to achieve the aforementioned objects, the present inventor repeated intensive research. As a result, they obtained knowledge that when a polymerizable compound having an ethylenically unsaturated group is photopolymerized, if a specific photopolymerization initiator and a specific compound (a chain transfer agent precursor) which functions as a hydrogen donor under an acidic condition are concurrently used, excellent photopolymerization efficiency is exhibited under an acidic condition. The present inventor also obtained knowledge that if an ink composed of an aqueous composition, which contains the respective components described above and a colorant, is prepared, ejected onto a recording medium, and photopolymerized under an acidic condition, it is possible to form a high-accuracy and high-quality image which hardly undergoes blurring or the like and is excellent in fastness. Based on this knowledge, the present inventor further repeated research and accomplished the present invention.

The aforementioned objects of the present invention were achieved by the following ink composition, ink set, and image forming method.

<1> An ink composition containing the following (A) to (D):

(A) a polymerizable compound having an ethylenically unsaturated group, (B) a photopolymerization initiator other than a photopolymerization initiator having a biimidazole structure, (C) water, and (D) a chain transfer agent precursor represented by the following Formula (1).

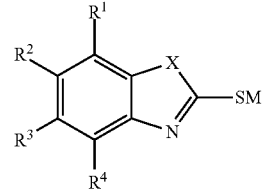

Formula (1)

In Formula (1), each of $R^1$ to $R^4$ represents a hydrogen atom or a substituent; X represents an oxygen atom or a sulfur atom; and M represents an alkali metal.

<2> The ink composition described in <1>, in which the (A) polymerizable compound having the ethylenically unsaturated group is a (meth)acrylamide compound having two or more (meth)acrylamide groups.

<3> The ink composition described in <1> or <2>, in which the (B) photopolymerization initiator is an aromatic ketone compound.

<4> The ink composition described in any one of <1> to <3>, further containing (E) a colorant.

<5> The ink composition described in any one of <1> to <4>, further containing (F) a trialkylamine.

<6> An ink set including the ink composition described in any one of <1> to <5> and an acid treatment agent containing an acidic compound.

<7> The ink set described in <6>, in which the acidic compound is an acid which has a molecular weight of 50 or greater to 200 or less and a pKa of 1 or greater to 5 or less in water with a temperature of 25° C.

<8> An image forming method including providing an acid treatment agent containing an acidic compound onto a recording medium, applying the ink composition described in any one of <1> to <5> onto the recording medium having provided the acidic compound to form an image, and polymerizing a polymerizable compound in the image by irradiating the image with actinic energy rays.

In the present specification, "(meth)acryloyl" means either or both of acryloyl (—C(=O)CH=CH$_2$) and methacryloyl (—C(=O)C(CH$_3$)=CH$_2$). The same will be applied to the terms "(meth)acryl", "(meth)acrylate", and "(meth)acrylamide".

In the present specification, unless otherwise specified, when a plurality of substituents, linking groups, ligands, or the like (hereinafter, these will be referred to as "substituents or the like") is marked with a specific symbol, or when the plurality of substituents or the like is collectively or selectively defined, the substituents or the like may be the same as or different from each other. The same will be applied to a case of defining the number of the substituents or the like.

In the present specification, a "group" of each group described as an example of each substituent means both an unsubstituted group and a group having a substituent. For example, an "alkyl group" means an alkyl group which may have a substituent.

In the present specification, when a term "compound" is read by being positioned at the end of another word, or when the compound is represented by a specific name or a specific chemical formula, unless otherwise specified, the compound means not only the compound itself but also a salt, a complex, and an ion thereof.

In the present specification, the "total amount of solid components" refers to the total mass of components remaining after a solvent component is excluded from all the components constituting a composition. That is, the total amount of solid components refers to the total mass of nonvolatile components.

The ink composition of the present invention contains a polymerizable component, and under an acidic condition, the polymerization efficiency of the polymerizable component resulting from light irradiation (irradiation with actinic energy rays) is further increased. Therefore, if the ink composition of the present invention is used for forming an image, it is possible to form a high-accuracy image having a higher degree of fastness.

The ink set of the present invention is constituted with the ink composition and a treatment agent which creates an acidic condition. If the ink set is used, it is possible to form a high-accuracy image having a higher degree of fastness.

According to the image forming method of the present invention, it is possible to form an image having fastness and higher degree of accuracy.

DESCRIPTION OF THE PREFERRED EMBODIMENTS

Hereinafter, the present invention will be more specifically described.

[Ink Composition]

The ink composition (hereinafter, also simply referred to as an "ink") of the present invention contains at least (A) a polymerizable compound having an ethylenically unsaturated group, (B) a specific photopolymerization initiator, (C) water, and (D) a specific chain transfer agent precursor.

That is, the ink composition of the present invention contains one kind or two or more kinds of each of the aforementioned components (A) to (D).

The ink composition of the present invention can contain one kind of (E) colorant or two or more kinds of (E) colorants. When the ink composition does not contain a colorant, the ink composition can be used as a clear ink. When the ink composition contains a colorant, the ink composition can be used for forming a color image.

The ink composition of the present invention may further contain one kind of (F) trialkylamine or two or more kinds of (F) trialkylamines. If the ink composition contains trialkylamine, the photopolymerization efficiency of the polymerizable compound can be further improved.

The ink composition used in the present invention can be preferably used as an ink for forming an image by using an ink jet method.

If the ink composition of the present invention contains the aforementioned components in combination, polymerization sensitivity under an acidic condition becomes excellent. If an image is formed on a recording medium by using the ink composition, and the image is irradiated with actinic energy rays such as UV under an acidic condition, an image having excellent blocking resistance can be formed.

<(A) Polymerizable Compound Having Ethylenically Unsaturated Group>

The polymerizable compound having an ethylenically unsaturated group (hereinafter, the compound will be also simply referred to as a "polymerizable compound") is a compound having at least one radically polymerizable ethylenically unsaturated bond in a molecule. The polymerizable compound is not particularly limited as long as it can be initiated a polymerization reaction by a photopolymerization initiator. The polymerizable compound may be one of a monomer, oligomer, polymer, and the like.

In the present invention, from the viewpoint of accomplishing both the improvement of film quality and solubility, a molecular weight of the polymerizable compound is preferably 50 to 2,000, more preferably 80 to 1,500, and even more preferably 100 to 800.

The ethylenically unsaturated group is a group having a carbon-carbon double bond. Although the carbon-carbon double bond may be conjugated with other saturated bonds, the ethylenically unsaturated group does not include a double bond in a stable aromatic ring such as a benzene ring.

Examples of the ethylenically unsaturated group include a vinyl group (—CH=$CH_2$), a (meth)acryloyl group [—C(=O)CH=$CH_2$, —C(=O)C($CH_3$)=$CH_2$], a vinylsulfonyl group (—$SO_2$CH=$CH_2$), or —C(=O)CH=CHC(=O)— which the group is a partial structure of maleimide.

Examples of the structure having a vinyl group include —O—CH=$CH_2$, >N—CH=$CH_2$, —S—CH=$CH_2$, —O—$CH_2$CH=$CH_2$, —CH=$CH_2$ of styrene, and the like. Examples of the structure having a (meth)acryloyl group include a (meth)acryloyl group, a (meth)acryloyloxy group, a (meth)acryloylamide group, and the like.

The polymerizable compound used in the present invention is preferably a compound which has a carbon-carbon double bond on a terminal of a molecule or a compound which has a maleimide ring group in a molecule.

From the viewpoint of ejection stability of the ink composition, the polymerizable compound used in the present invention is preferably a water-soluble compound. The solubility of the polymerizable compound used in the present invention is not particularly limited. However, the solubility of the polymerizable compound in water at 25° C. is preferably equal to or greater than 2% by mass, more preferably equal to or greater than 5% by mass, even more preferably equal to or greater than 10% by mass, and particularly preferably equal to or greater than 20% by mass. The polymerizable compound of the present invention is most preferably uniformly mixed with water at any ratio.

Specifically, examples of the polymerizable compound used in the present invention include a (meth)acrylamide compound, a (meth)acrylate compound, a vinyl compound, a maleimide compound, a vinylsulfone compound, and a N-vinylamide compound. As the polymerizable compound used in the present invention, a compound having one ethylenically unsaturated group in a molecule may be used. However, from the viewpoint of further improving curability, the polymerizable compound used in the present invention preferably contains a compound having two or more ethylenically unsaturated groups in a molecule, and more preferably contains a compound having three or more ethylenically unsaturated groups in a molecule. When a compound having two or more ethylenically unsaturated groups in a molecule is contained in the polymerizable compound, the photopolymerization method in the image forming method of the present invention is a photocuring method. The polymerizable compound used in the present invention is preferably a (meth)acrylamide compound, a (meth)acrylate compound, or a vinyl compound, and among these, a (meth)acrylamide compound having two or more (meth)acrylamide groups in a molecule can be preferably used.

In the ink composition of the present invention, one kind of the aforementioned polymerizable compound may be used alone, or two or more kinds thereof may be used concurrently. When two or more kinds of the polymerizable compounds are used concurrently, two or more kinds selected from a (meth)acrylamide compound, a (meth)acrylate compound, a vinyl compound, a maleimide compound, a vinylsulfone compound, and a N-vinylamide compound may be used by being mixed together. It is more preferable that at least one kind among the compounds is a (meth)acrylamide compound.

From the viewpoint of improving water solubility, the aforementioned polymerizable compound may have a poly(ethyleneoxy) chain, a poly(propyleneoxy) chain, an ionic group (for example, a carboxyl group, a sulfo group, or the like), a hydroxyl group, and the like in a molecule.

—(Meth)acrylamide Compound—

Specific examples of a monofunctional (meth)acrylamide compound and a polyfunctional (meth)acrylamide compound that can be used in the present invention are shown below, but the present invention is not limited thereto.

(Monofunctional (meth)acrylamide)

monomer 1
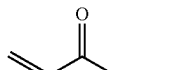

monomer 2
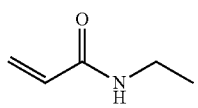

monomer 3
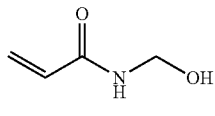

monomer 4
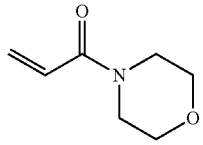

monomer 5
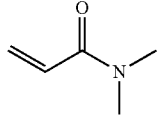

monomer 6
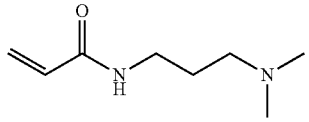

-continued monomer 7
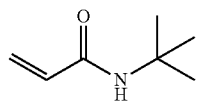

monomer 8
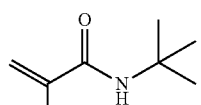

monomer 9
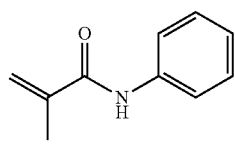

monomer 10
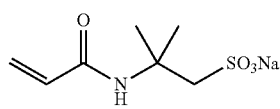

monomer 11
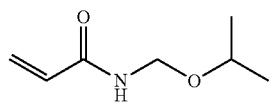

monomer 12
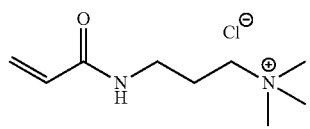

monomer 13
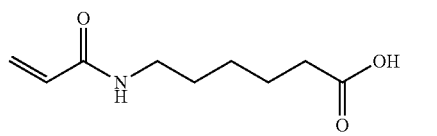

monomer 14

monomer 15

monomer 16
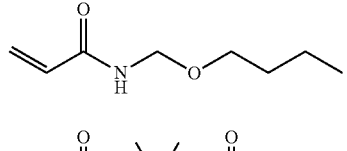

monomer 17
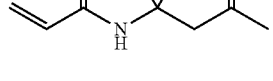

monomer 18
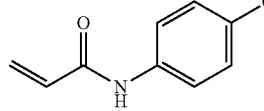

monomer 19
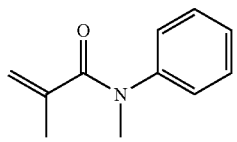
monomer 20
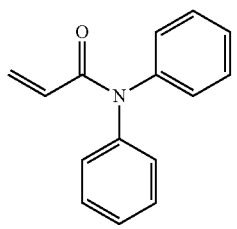
(Polyfunctional (meth)acrylamide)
monomer 21
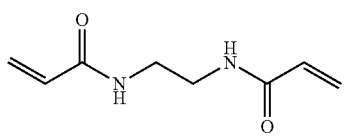
monomer 22
monomer 23
monomer 24
monomer 25
monomer 26
monomer 27
monomer 28
monomer 29
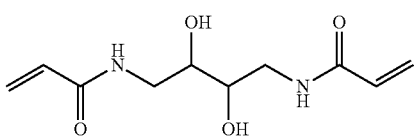
monomer 30
monomer 31
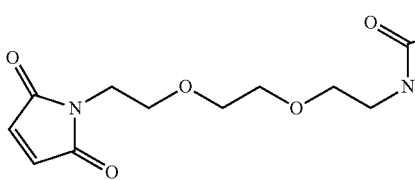
monomer 32
monomer 33
monomer 34
monomer 35
monomer 36
monomer 37
monomer 38
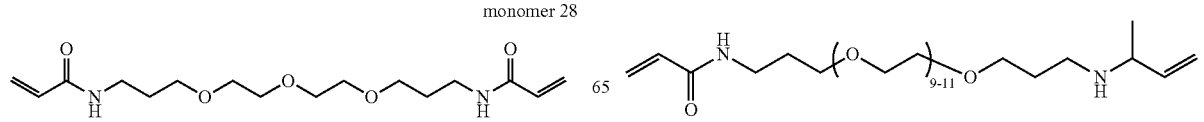

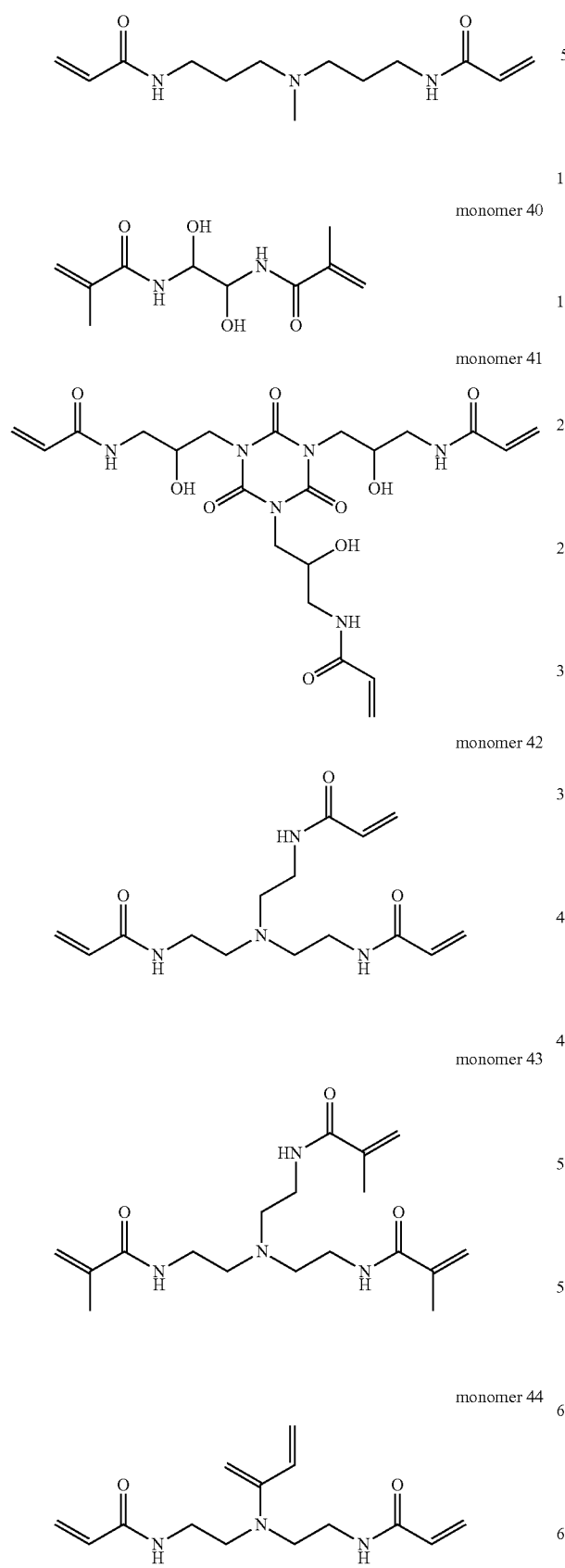
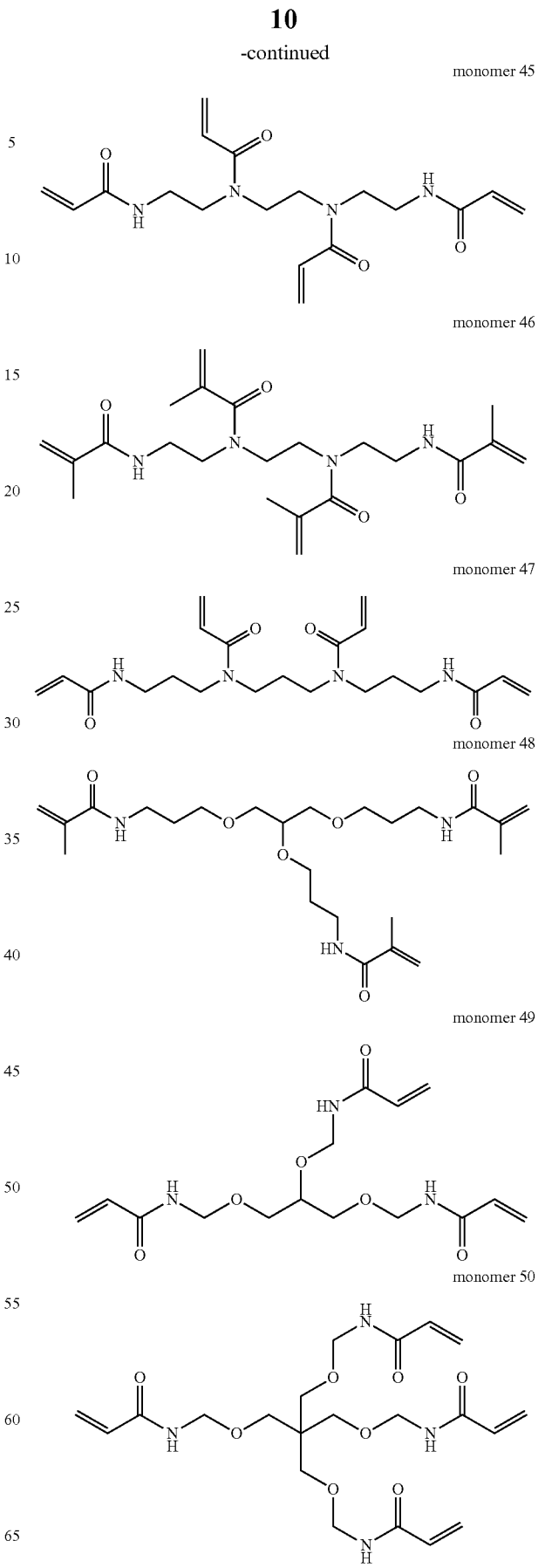

monomer 51

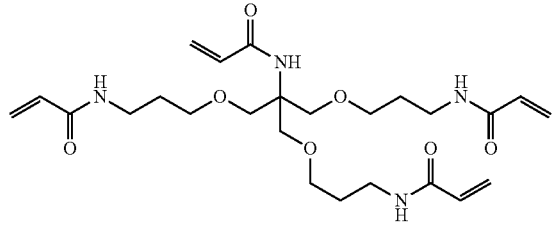

From the viewpoint of curability and solubility, among the acrylamide compounds exemplified above, monomers 21, 27, 28, 42, 44, and 51 are preferably used.

These (meth)acrylamide compounds can be synthesized by a general acrylamide compound synthesis method (for example, Journal of the American Chemical Society, 1979, 101, 5383).

—(Meth)acrylate Compound—

Specific examples of a monofunctional (meth)acrylate compound and a polyfunctional (meth)acrylate compound that can be used in the present invention will be shown below, but the present invention is not limited thereto.

Examples of the monofunctional (meth)acrylate compound include isoamyl(meth)acrylate, stearyl(meth)acrylate, lauryl(meth)acrylate, octyl(meth)acrylate, isooctyl (meth)acrylate, decyl(meth)acrylate, isoamyl stearyl(meth) acrylate, isostearyl(meth)acrylate, 2-ethylhexyl diglycol (meth)acrylate, 2-hydroxybutyl(meth)acrylate, butoxyethyl (meth)acrylate, methoxydiethylene glycol(meth)acrylate, methoxypolyethylene glycol(meth)acrylate, methoxypropylene glycol(meth)acrylate, tetrahydrofurfuryl(meth)acrylate, isobornyl(meth)acrylate, 2-hydroxyethyl(meth)acrylate, 2-hydroxypropyl(meth)acrylate, 2-(meth)acryloyloxy ethyl succinate, 2-(meth)acryloyloxy ethyl-2-hydroxyethyl phthalate, lactone-modified flexible (meth)acrylate, t-butylcyclohexyl(meth)acrylate, 2-(2-ethoxyethoxyl)ethyl acrylate, cyclopentenyl acrylate, cyclopentenyloxy ethyl acrylate, dicyclopentanyl acrylate, and the like.

Examples of the polyfunctional (meth)acrylate compound include bis(4-acryloxypolyethoxyphenyl)propane, neopentyl glycol di(meth)acrylate, ethoxylated (2) neopentyl glycol di(meth)acrylate (a compound obtained by diacrylating a 2-mol adduct of neopentyl glycol ethylene oxide), propoxylated (2) neopentyl glycol di(meth)acrylate (a compound obtained by diacrylating a 2-mol adduct of neopentyl glycol propylene oxide), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, tetramethylolmethane tri(meth)acrylate, dimethyloltricyclodecane di(meth)acrylate, modified glycerin tri(meth)acrylate, modified bisphenol A di(meth)acrylate, propylene oxide (PO) adduct di(meth)acrylate of bisphenol A, ethylene oxide (EO) adduct di(meth)acrylate of bisphenol A, dipentaerythritol hexa(meth)acrylate, caprolactone-modified dipentaerythritol hexa(meth)acrylate, and the like.

The amount of the polymerizable compound contained in the ink composition used in the present invention is preferably 1 part by mass to 50 parts by mass, more preferably 1 part by mass to 40 parts by mass, and even more preferably 1 part by mass to 30 parts by mass, with respect to a total of 100 parts by mass of the solid components of the ink composition.

<(B) Photopolymerization Initiator>

The ink composition of the present invention contains at least one kind of photopolymerization initiator. Here, the ink composition of the present invention does not contain a photopolymerization initiator having a biimidazole structure.

The photopolymerization initiator used in the present invention is not particularly limited as long as it does not have a biimidazole structure. For example, at least one kind selected from aromatic ketone compounds and thio compounds can be used as the photopolymerization initiator. From the viewpoint of the temporal stability and reactivity of the photopolymerization initiator in the ink, it is preferable to use an aromatic ketone compound.

From the viewpoint of solubility and inhibiting volatilization, a molecular weight of the photopolymerization initiator used in the present invention is preferably 100 to 2,000, more preferably 200 to 1,800, and even more preferably 300 to 1,500.

The aromatic ketone compound that can be used as the photopolymerization initiator in the present invention is not particularly limited, as long as the compound functions as a photopolymerization initiator. Examples of the aromatic ketone compound include the following compounds.

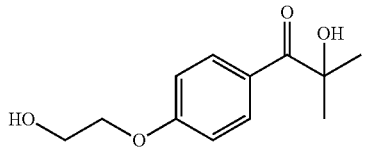

AK-1

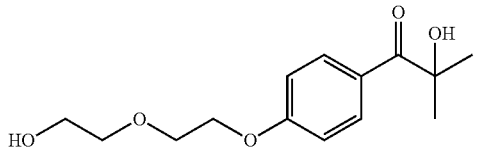

AK-2

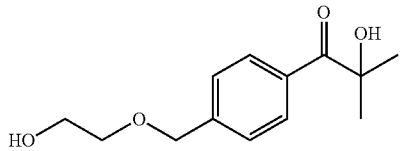

AK-3

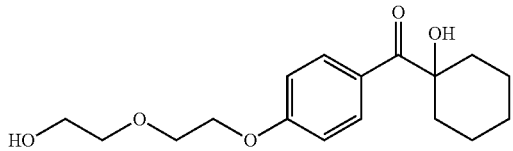

AK-4

-continued

AK-5
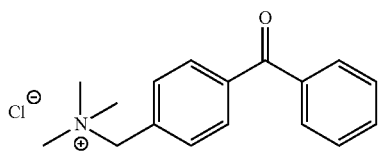

AK-6
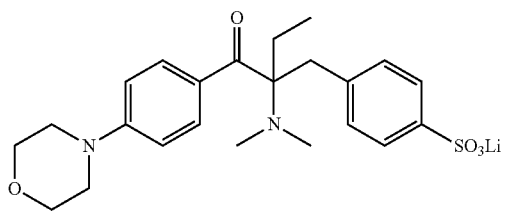

AK-7
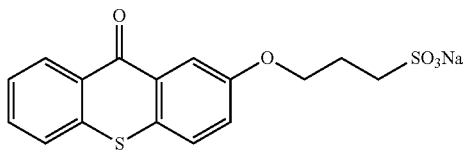

AK-8
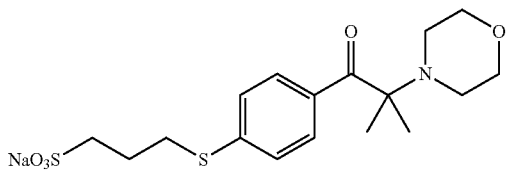

AK-9
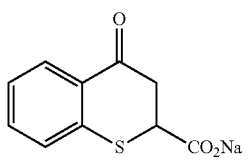

AK-10
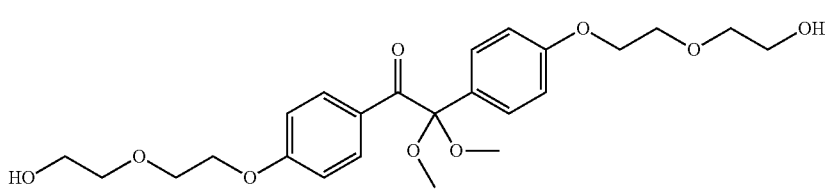

AK-11
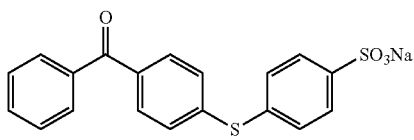

AK-12
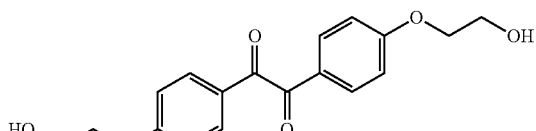

Examples of the thio compound that can be used as the photopolymerization initiator in the present invention include the following compounds.

TH-1
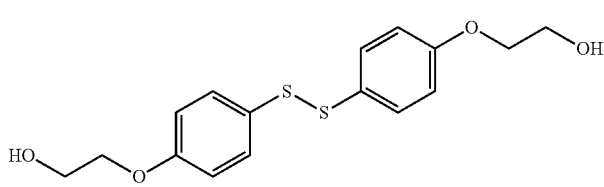

TH-2
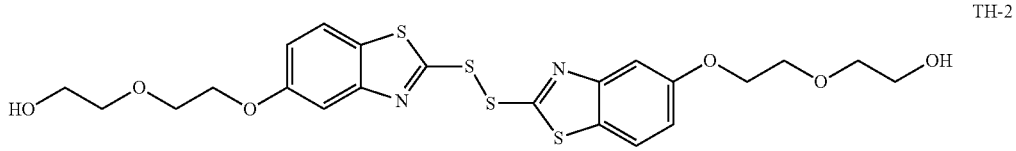

The amount of the photopolymerization initiator contained in the ink composition of the present invention is preferably 0.1 parts by mass to 40 parts by mass, more preferably 1 part by mass to 30 parts by mass, and even more preferably 5 parts by mass to 20 parts by mass, with respect to a total of 100 parts by mass of the solid components of the ink composition.

In the ink composition of the present invention, the photopolymerization initiator is preferably used in an amount of 0.1 parts by mass to 30 parts by mass, more preferably used in an amount of 1 part by mass to 20 parts by mass, and even more preferably used in an amount of 5 parts by mass to 15 parts by mass, with respect to 100 parts by mass of the polymerizable compound.

<(C) Water>

The ink composition of the present invention contains water. The water functions as a medium of the ink composition. As the water used in the ink composition of the present invention, water not containing ionic impurities, such as deionized water or distilled water, is preferable.

The amount of water contained in the ink composition of the present invention can be appropriately selected according to the purpose or the like. The amount of water contained in the ink composition is preferably 10% by mass to 90% by mass, and more preferably 40% by mass to 80% by mass.

<(D) Chain Transfer Agent Precursor>

The ink composition of the present invention contains a chain transfer agent precursor represented by the following Formula (1) (hereinafter, the compound will be simply referred to as a "chain transfer agent precursor" in some cases).

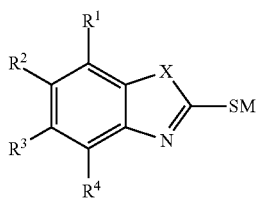

Formula (1)

In Formula (1), each of $R^1$ to $R^4$ represents a hydrogen atom or a substituent; X represents an oxygen atom or a sulfur atom; and M represents an alkali metal.

—SM in the chain transfer agent precursor represented by Formula (1) turns into —SH under an acidic condition, and as a result, the precursor functions as a chain transfer agent (hydrogen donor). That is, due to a radical species generated by the photopolymerization initiator, hydrogen atoms are abstracted from —SH of the chain transfer agent, and the chain transfer agent turns into an active radical species. The chain transfer agent having turned into a radical acts as a polymerization accelerator on the polymerizable compound having an ethylenically unsaturated group. Under a neutral or alkaline condition, —SM in the chain transfer agent precursor does not easily turn into —SH, and thus the precursor does not function as a hydrogen donor. Therefore, if the pH of the ink composition, which has been mixed with the chain transfer agent precursor represented by Formula (1), is adjusted to be neutral to alkaline, preservation stability of the ink composition can be further improved. In contrast, if the ink composition is made acidic at the time of photopolymerization (hereinafter, also referred to as a "photopolymerization reaction"), curability of the ink composition can be further improved.

Examples of the substituent used as $R^1$ to $R^4$ in Formula (1) include a halogen atom, a hydroxyl group, a carboxyl group, a sulfo group, an alkyl group (preferably an alkyl group having 1 to 10 carbon atoms, more preferably an alkyl group having 1 to 5 carbon atoms, even more preferably an alkyl group having 1 to 3 carbon atom, and still more preferably trifluoromethyl), an aryl group (preferably an aryl group having 6 to 15 carbon atoms and more preferably an aryl group having 6 to 12 carbon atoms), a heterocyclic group (preferably a 5-membered or 6-membered ring; the heterocyclic group preferably has an oxygen atom, a sulfur atom, or a nitrogen atom as a ring-constituting atom), an alkoxy group (preferably an alkoxy group having 1 to 10 carbon atoms, more preferably an alkoxy group having 1 to 5 carbon atoms, and even more preferably an alkoxy group having 1 to 3 carbon atoms), an aryloxy group (preferably an aryloxy group having 6 to 15 carbon atoms and more preferably an aryloxy group having 6 to 12 carbon atoms), an alkylthio group (preferably an alkylthio group having 1 to 10 carbon atoms, more preferably an alkylthio group having 1 to 5 carbon atoms, and even more preferably an alkylthio group having 1 to 3 carbon atoms), an amino group (including an alkylamino group and an arylamino group), an acyl group (preferably an acyl group having 2 to 10 carbon atoms, more preferably an acyl group having 2 to 5 carbon atoms, and even more preferably an acyl group having 2 to 3 carbon atoms), an alkoxycarbonyl group (preferably an alkoxycarbonyl group having 2 to 10 carbon atoms, more preferably an alkoxycarbonyl group having 2 to 5 carbon atoms, and even more preferably an alkoxycarbonyl group having 2 to 3 carbon atoms), an aryloxycarbonyl group (preferably an aryloxycarbonyl group having 7 to 16 carbon atoms and more preferably an aryloxycarbonyl group having 7 to 13 carbon atoms), an acylamide group (preferably an acylamide group having 2 to 10 carbon atoms, more preferably an acylamide group having 2 to 5 carbon atoms, and even more preferably an acylamide group having 2 to 3 carbon atoms), a sulfonamide group, a carbamoyl group, a sulfamoyl group, an alkylsulfonyl group (preferably an alkylsulfonyl group having 1 to 10 carbon atoms, more preferably an alkylsulfonyl group having 1 to 5 carbon atoms, and even more preferably an alkylsulfonyl group having 1 to 3 carbon atoms), an arylsulfonyl group (preferably an arylsulfonyl group having 6 to 15 carbon atoms and more preferably an arylsulfonyl group having 6 to 12 carbon atoms), and a cyano group.

An embodiment in which all of $R^1$ to $R^4$ in Formula (1) are hydrogen atoms and an embodiment in which one of $R^1$ to $R^4$ is an electron-withdrawing group and the others are hydrogen atoms are also preferable. Examples of the electron-withdrawing group include a halogen atom, a cyano group, an acyl group (preferably an acyl group having 2 to 10 carbon atoms, more preferably an acyl group having 2 to 5 carbon atoms, and even more preferably an acyl group having 2 to 3 carbon atoms), an alkoxycarbonyl group (preferably an alkoxycarbonyl group having 2 to 10 carbon atoms, more preferably an alkoxycarbonyl group having 2 to 5 carbon atoms, and even more preferably an alkoxycarbonyl group having 2 to 3 carbon atoms), an aryloxycarbonyl group (preferably an aryloxycarbonyl group having 7 to 16 carbon atoms and more preferably an aryloxycarbonyl group having 7 to 13 carbon atoms), a carbamoyl group, an alkylsulfonyl group, an arylsulfonyl group (preferably an arylsulfonyl group having 1 to 10 carbon atoms, more preferably an arylsulfonyl group having 1 to 5 carbon atoms, and even more preferably an arylsulfonyl group having 1 to 3 carbon atoms), a sulfamoyl group, an alkoxy group (preferably an alkoxy group having 1 to 10 carbon atoms, more preferably an alkoxy group having 1 to 5 carbon atoms, and even more preferably an alkoxy group having 1 to 3 carbon atoms), and an aryloxy group (preferably an aryloxy group having 6 to 15 carbon atoms and more preferably an aryloxy group having 6 to 12 carbon atoms). The electron-withdrawing group is more preferably a halogen atom (preferably a chlorine atom) or an alkoxy group (preferably methoxy or ethoxy).

The alkali metal represented by M in Formula (1) is preferably sodium or potassium.

In the present invention, from the viewpoint of inhibiting volatilization and from the viewpoint of solubility, a molecular weight of the chain transfer agent precursor represented by Formula (1) is preferably 50 to 1,500, more preferably 80 to 1,000, and even more preferably 100 to 500.

Specific examples of the compound represented by Formula (1) will be shown below, but the present invention is not limited thereto. In the compounds exemplified below, M represents sodium or potassium.

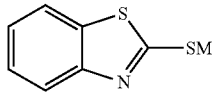
B-1

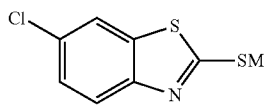
B-2

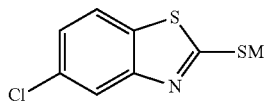
B-3

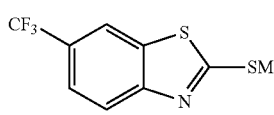
B-4

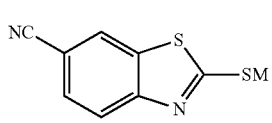
B-5

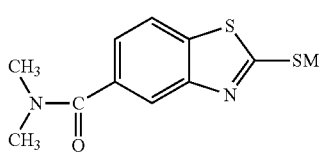
B-6

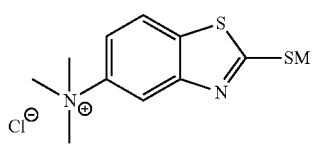
B-7

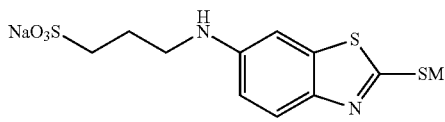
B-8

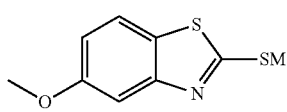
B-9

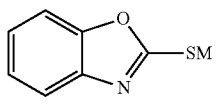
B-10

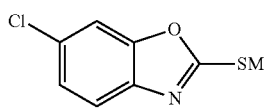
B-11

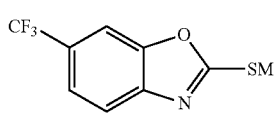
B-12

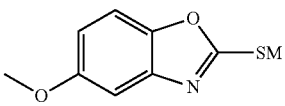
B-13

The amount of the chain transfer agent precursor contained in the ink composition of the present invention is preferably 0.1 parts by mass to 40 parts by mass, more preferably 1 part by mass to 30 parts by mass, and even more preferably 1 part by mass to 20 parts by mass, with respect to a total of 100 parts by mass of the solid components of the ink composition.

The amount of the chain transfer agent precursor contained in the ink composition used in the present invention is preferably 5 parts by mass to 1,500 parts by mass, more preferably 10 parts by mass to 1,000 parts by mass, and even more preferably 20 parts by mass to 500 parts by mass, with respect to 100 parts by mass of the photopolymerization initiator contained in the composition.

<Other Components>

If necessary, other components, for example, one kind or two or more kinds selected from a colorant, trialkylamine, a medium, and a dispersant may be contained in the ink composition of the present invention.

—(E) Colorant—

The colorant used in the ink composition of the present invention can be used not only for forming a monochromic image but also for forming a polychromic image (for example, a full color image), and the image can be formed by selecting a single color intended or two or more colors intended. For forming a full color image, the ink composition can be used as, for example, an ink with a magenta tone, an ink with a cyan tone, and an ink with a yellow tone. Furthermore, the ink composition can be used as an ink with a black tone.

The ink composition of the present invention can be used as an ink composition with a color tone of red (R), green (G), blue (B), or white (W) in addition to the color tone of yellow (Y), magenta (M), cyan (C), and black (K), an ink composition of a so-called special color in the field of printing, and the like.

The ink composition with each of the color tones described above can be prepared by changing the color of a colorant (for example, a pigment) as intended.

In the ink composition of the present invention, a known dye, pigment, or the like can be used as a colorant without particular limitation. From the viewpoint of coloring properties of the formed image, a colorant is preferable which substantially does not dissolve in water or poorly dissolves in water. Specific examples thereof include various pigments, disperse dyes, oil-soluble dyes, coloring agents forming a J-aggregate, and the like. Considering light fastness, the colorant is more preferably a pigment.

The type of the pigment used in the ink composition of the present invention is not particularly limited, and general organic or inorganic pigments can be used.

Examples of the organic pigments include an azo pigment, a polycyclic pigment, a dye chelate, a nitro pigment, a nitroso pigment, aniline black, and the like. Among these, an azo pigment, a polycyclic pigment, and the like are more preferable. Examples of the azo pigment include an azo lake, an insoluble azo pigment, a condensed azo pigment, a chelated azo pigment, and the like. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, and the like. Examples of the dye chelate include a basic dye-type chelate, an acid dye-type chelate, and the like.

Examples of the inorganic pigments include titanium oxide, iron oxide, calcium oxide, barium oxide, aluminum hydroxide, barium yellow, cadmium red, chrome yellow, carbon black, and the like. Among these, carbon black is particularly preferable. Examples of the carbon black include those manufactured by a known method such as a contact method, a furnace method, or a thermal method.

Specific examples of the pigments that can be used in the present invention include the pigments described in paragraphs 0142 to 0145 in JP2007-100071A and the like.

When a dye is used as a coloring component in the ink composition of the present invention, a dye supported on a water-insoluble support can be used as a colorant. Known dyes can be used as the dye without particular limitation. For example, in the present invention, the dyes described in JP2001-115066A, JP2001-335714A, JP2002-249677A, and the like can also be preferably used. Furthermore, the support is not particularly limited as long as it is insoluble or poorly soluble in water. As the support, an inorganic material, an organic material, or a composite material of these can be used. Specifically, in the present invention, the supports described in JP2001-181549A, JP2007-169418A, and the like can also be preferably used.

The support (colorant) supporting a dye can be used as is. Alternatively, if necessary, it can be used concurrently with a dispersant. As the dispersant, a dispersant which will be described later can be preferably used.

One kind of colorant may be used alone. Alternatively, plural kinds of colorants may be selected and used in combination.

From the viewpoint of color density, graininess, stability of the ink, and ejection reliability, the amount of the colorant contained in the ink composition of the present invention is preferably 1% by mass to 25% by mass and more preferably 5% by mass to 20% by mass. Even when the ink composition of the present invention contains a relatively large amount (6% by mass to 25% by mass) of the colorant, sufficient curability can be obtained.

—(F) Trialkylamine—

If the ink composition used in the present invention contains (F) a trialkylamine, the photopolymerization efficiency can be further improved. The following is assumed to be the mechanism, although it is not a definite mechanism.

A polymerization reaction of a polymerizable compound is caused by a free radical which is generated in a polymerization initiation process or a chain transfer process. However, if there are a lot of oxygen molecular, the free radical turns into a peroxy radical which is inert with respect to the polymerizable compound, and therefore a polymerization reaction does not easily proceed. Presumably, in contrast, if trialkylamine is added to a polymerization reaction in situ, hydrogen of trialkylamine is abstracted due to the peroxy radical, and as a result, an amino radical which is active with respect to the polymerizable compound is generated, and a polymerization reaction proceeds.

Trialkylamine that can be used in the present invention is represented by the following Formula (TA).

$$N(R^{ta})_3 \quad (TA)$$

In Formula (TA), $R^{ta}$ represents a substituted or unsubstituted alkyl group. The number of carbon atoms contained in the alkyl group is preferably 1 to 10, more preferably 1 to 5, and even more preferably 1 to 3. The substituent that $R^{ta}$ may have is not particularly limited, and examples thereof include a hydroxyl group, an alkoxy group, a carboxyl group, an amide group, and an amino group. Among these, a hydroxyl group is more preferable.

Specific examples of the trialkylamine that can be used in the present invention include N-methyl diethanolamine, triethylamine, triisopropanolamine, triethanolamine, N,N, N',N'-tetramethyl ethylenediamine, N,N-dimethyl glycine, 2-(dimethylamino)ethanol, 2-(diethylamino)ethanol, and 2-[2-(dimethylamino)ethoxy]ethanol. Among these, N-methyl diethanolamine, triethylamine, or triisopropanolamine can be preferably used.

The amount of the trialkylamine contained in the ink composition used in the present invention is preferably 0.1 parts by mass to 20 parts by mass, more preferably 0.5 parts by mass to 10 parts by mass, and even more preferably 1 part by mass to 5 parts by mass, with respect to a total of 100 parts by mass of the solid components of the ink composition.

—Medium—

The ink composition of the present invention can also contain a medium (solvent) component in addition to water as the component (C). Examples of the medium include a water-soluble organic solvent.

Examples of the water-soluble organic solvent include an alcohol, a ketone, an ether compound, an amide compound, a nitrile compound, and a sulfone compound. Examples of the alcohol include ethanol, isopropanol, n-butanol, t-butanol, isobutanol, diacetone alcohol, and ethylene glycol. Examples of the ketone include acetone, methyl ethyl ketone, diethyl ketone, and methyl isobutyl ketone. Examples of the ether compound include dibutyl ether, tetrahydrofuran, and dioxane. Examples of the amide compound include dimethylformamide and diethylformamide. Examples of the nitrile compound include acetonitrile. Examples of the sulfone compound include dimethyl sulfoxide, dimethyl sulfone, sulfolane, and the like.

The amount of the medium contained in the ink composition can be appropriately selected according to the respective purpose or the like. However, the amount of the medium contained in the ink composition is preferably 10% by mass to 95% by mass and more preferably 30% by mass to 90% by mass.

—Dispersant—

When the ink composition of the present invention is an aqueous ink composition, and the colorant is a pigment, it is possible to obtain an ink composition containing coloring particles dispersed in an aqueous solvent by a dispersant (hereinafter, the particles are simply referred to as "coloring particles").

The dispersant may be a polymer dispersant or a low-molecular weight surfactant-type dispersant. Furthermore, the polymer dispersant may be a water-soluble polymer dispersant or a water-insoluble polymer dispersant. In the present invention, from the viewpoint of dispersion stability and ejection properties in a case in which the dispersant is used in an ink jet method, the dispersant is preferably a water-insoluble polymer dispersant.

The water-insoluble polymer dispersant (hereinafter, simply referred to as a "dispersant" in some cases) is a polymer insoluble in water. The water-insoluble polymer dispersant is not particularly limited as long as it can disperse a pigment, and water-insoluble polymer dispersants known in the related art can be used. For example, the water-insoluble polymer dispersant can be constituted with both a hydrophobic constitutional unit and a hydrophilic constitutional unit.

Examples of a monomer constituting the hydrophilic constitutional unit include a styrene-based monomer, an alkyl(meth)acrylate, an aromatic group-containing (meth) acrylate, and the like.

A monomer constituting the hydrophilic constitutional unit is not particularly limited as long as it is a monomer containing a hydrophilic group. Examples of the hydrophilic group include a nonionic group, a carboxyl group, a sulfonic acid group, a phosphoric acid group, and the like. Examples of the nonionic group include a hydroxyl group, an amide group (having an unsubstituted nitrogen atom), a group derived from an alkylene oxide polymer (for example, polyethylene oxide, polypropylene oxide, or the like), a group derived from a sugar alcohol, and the like.

From the viewpoint of dispersion stability, the hydrophilic constitutional unit preferably contains at least a carboxyl group. Furthermore, the hydrophilic constitutional unit also preferably contains both a nonionic group and a carboxyl group.

Specific examples of the water-insoluble polymer dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol(meth)acrylate-(meth)acrylic acid copolymer, a styrene-maleic acid copolymer, and the like.

From the viewpoint of dispersion stability of the pigment, the water-insoluble polymer dispersant is preferably a vinyl polymer containing a carboxyl group, and more preferably a vinyl polymer which has at least a constitutional unit, which is derived from an aromatic group-containing monomer, as the hydrophobic constitutional unit and has a carboxyl group-containing constitutional unit as the hydrophilic constitutional unit.

From the viewpoint of dispersion stability of the pigment, a weight average molecular weight of the water-insoluble polymer dispersant is preferably 3,000 to 200,000, more preferably 5,000 to 100,000, even more preferably 5,000 to 80,000, and particularly preferably 10,000 to 60,000.

From the viewpoint of dispersion properties of the pigment, coloring properties of the ink, and dispersion stability, the amount of the dispersant contained in the coloring particles is preferably 10 parts by mass to 90 parts by mass, more preferably 20 parts by mass to 70 parts by mass, and even more preferably 30 parts by mass to 50 parts by mass, with respect to 100 parts by mass of the pigment.

If the amount of the dispersant contained in the coloring particles is within the above range, it is preferable since the pigment is covered with the dispersant in an appropriate amount, and coloring particles having a small particle size and excellent temporal stability tend to be easily obtained.

For example, by dispersing a mixture, which contains the pigment, the dispersant, a solvent (preferably an organic solvent) which is used if necessary, and the like, by using a disperser, the coloring particles can be obtained in the form of a coloring particle dispersion.

For example, the coloring particle dispersion can be manufactured by performing a step (mixing/hydrating step) of adding a basic substance-containing aqueous solution to a mixture of the aforementioned pigment, the aforementioned water-insoluble polymer dispersant, and an organic solvent which dissolves or disperses the dispersant, and then performing a step (solvent removing step) of removing the organic solvent. In this way, the pigment is finely dispersed, and a dispersion of coloring particles having excellent preservation stability can be prepared.

The organic solvent needs to be able to dissolve or disperse the water-insoluble polymer dispersant. In addition to this, it is preferable that the organic solvent exhibits affinity with water to some extent. Specifically, the solubility of the organic solvent in water is preferably 10% by mass to 50% by mass at 20° C.

The aforementioned basic substance is used for neutralizing an anionic group (preferably a carboxyl group) that the polymer has in some cases. A degree of neutralization of the anionic group is not particularly limited. Generally, the finally obtained dispersion of the coloring particles preferably has properties in which the pH thereof is 4.5 to 10 for example. The pH can be determined by an intended degree of neutralization of the aforementioned polymer.

Preferable examples of the organic solvent include the water-soluble organic solvents described in the section of "Medium" that the aforementioned ink composition can contain. Among these, isopropanol, acetone, and methyl ethyl ketone are preferable, and methyl ethyl ketone is particularly preferable. One kind of the organic solvent may be used alone, or plural kinds thereof may be used concurrently.

In the process of manufacturing the coloring particle dispersion, the method for removing the organic solvent is not particularly limited, and a known method such as distillation under reduced pressure can be used for removing the organic solvent.

In the ink composition of the present invention, one kind of the coloring particles may be used alone, or two or more kinds thereof may be used in combination.

In the present invention, a volume average particle size of the colorant (or the coloring particles) is preferably 10 nm to 200 nm, more preferably 10 nm to 150 nm, and even more preferably 10 nm to 100 nm. If the volume average particle size is equal to or less than 200 nm, color reproducibility become excellent, and droplet ejection characteristics become excellent in the case of an ink jet method. If the volume average particle size is equal to or greater than 10 nm, light fastness becomes excellent.

The particle size distribution of the colorant (or the coloring particles) is not particularly limited, and may be a wide particle size distribution or a monodisperse particle size distribution. Furthermore, two or more kinds of colorants having a monodisperse particle size distribution may be used by being mixed together.

The volume average particle size and the particle size distribution of the colorant (or the coloring particles) can be measured by using a light scattering method for example.

<Physical Properties of Ink Composition>

The surface tension (25° C.) of the ink composition of the present invention is preferably equal to or greater than 20 mN/m and equal to or less than 60 mN/m, more preferably equal to or greater than 20 mN/m and equal to or less than 45 mN/m, and even more preferably equal to or greater than 25 mN/m and equal to or less than 40 mN/m.

The surface tension of the ink composition is measured under a condition of 25° C. by using an Automatic Surface Tensiometer CBVP-Z (manufactured by Kyowa Interface Science Co., LTD.)

The viscosity at 25° C. of the ink composition of the present invention is preferably equal to or greater than 1.2 mPa·s and equal to or less than 15.0 mPa·s, more preferably equal to or greater than 2 mPa·s and less than 13 mPa·s, and even more preferably equal to or greater than 2.5 mPa·s and less than 10 mPa·s.

The viscosity of the ink composition is measured under a condition of 25° C. by using a VISCOMETER TV-22 (manufactured by TOKI SANGYO CO., LTD.).

From the viewpoint of the stability of the ink composition, the pH of the ink composition is preferably 6 to 11. When the ink composition is used in the ink set which will be described later, it is preferable for the ink composition to be aggregated at a high speed by coming into contact with an acid treatment agent, and accordingly, the pH of the ink composition is more preferably 7 to 10 and even more preferably 7 to 9.

[Ink Set]

The ink set of the present invention is composed of at least the part of the aforementioned ink composition and an acid treatment agent which can form an aggregate by coming into contact with the ink composition.

If the ink composition and the acid treatment agent are used for forming an image, it is possible to form an image which has excellent image quality, high curing sensitivity, and excellent blocking resistance.

Hereinafter, the acid treatment agent constituting the ink set will be described.

<Acid Treatment Agent>

The acid treatment agent constituting the ink set contains at least one kind of acidic compound. If necessary, the acid treatment agent contains other components as constituents. Examples of the other components include the aforementioned water-soluble organic solvent and a cationic polymer.

Generally, the acid treatment agent used in the present invention is an aqueous solution.

[Acidic Compound]

By coming into contact with the ink composition on a recording medium, the acidic compound used in the acid treatment agent functions as an fixing agent that can aggregate (fix) the ink composition. For example, if the acid treatment agent is provided to a recording medium (preferably coated paper), and the ink composition is ejected in the form of droplets to the recording medium in this state, the components in the ink composition can be aggregated, and the ink composition can be fixed on the recording medium.

Furthermore, if the acid treatment agent is provided to the recording medium in advance, it is possible to improve the polymerization efficiency of the ink composition ejected in the form of droplets onto the recording medium.

Examples of the acidic compound contained in the acid treatment agent include at least one kind selected from sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxalic acid, and benzoic acid. From the viewpoint of accomplishing both the inhibition of volatilization and the solubility in a solvent, the acidic compound is preferably an acid having a molecular weight of equal to or greater than 35 and equal to or less than 1,000, more preferably an acid having a molecular weight of equal to or greater than 50 and equal to or less than 500, and particularly preferably an acid having a molecular weight of equal to or greater than 50 and equal to or less than 200. Furthermore, from the viewpoint of accomplishing both the prevention of blurring and photo-curability in the ink, the acidic compound is preferably an acid with a pKa (25° C. in water) of equal to or greater than −10 and equal to or less than 7, more preferably an acid with a pKa of equal to or greater than 1 and equal to or less than 7, and particularly preferably an acid with a pKa of equal to or greater than 1 and equal to or less than 5.

Among the above acids, an acid having a high degree of water solubility is preferable. In addition, from the viewpoint of fixing the entirety of the ink by reacting with the ink composition, an acid having a valency of equal to or less than 3 is preferable, and an acid having a valency of equal to or greater than 2 and equal to or less than 3 is particularly preferable.

In the present invention, one kind of the acidic compound may be used alone, or two or more kinds thereof may be used concurrently.

When the acid treatment agent is an aqueous solution, the pH (25° C.) of the acid treatment agent is preferably 0.1 to 6.8, more preferably 0.5 to 6.0, and even more preferably 0.8 to 5.0.

The amount of the acidic compound contained in the acid treatment agent is preferably equal to or less than 40% by mass, more preferably 15% by mass to 40% by mass, even more preferably 15% by mass to 35% by mass, and particularly preferably 20% by mass to 30% by mass. If the amount of the acidic compound contained in the acid treatment agent is 15% by mass to 40% by mass, the components in the ink composition can be more efficiently fixed.

The amount of the acidic compound provided to a recording medium is not particularly limited, as long as the amount is enough for aggregating the ink composition and enables the chain transfer agent precursor to turn into a hydrogen donor. The amount of the acidic compound provided to a recording medium is preferably 0.5 $g/m^2$ to 4.0 $g/m^2$ and more preferably 0.9 $g/m^2$ to 3.75 $g/m^2$ because the ink composition is easily fixed in this range.

[Photopolymerization]

In the image forming method of the present invention, the ink composition of the present invention is irradiated with actinic energy rays such as ultraviolet rays under an acidic condition, and in this way, the polymerizable compound in the ink composition can be efficiently photopolymerized. By the photopolymerization, a high-accuracy ink image that exhibits a higher degree of fastness can be formed. At the time of the photopolymerization, an actinic energy ray irradiation step which will be described later is preferably adopted.

<Acidic Condition>

An acidic condition means a reaction system in an acidic state in which at least one kind of acid is present in a solution. The amount of the acid contained in the reaction system is not particularly limited as long as the amount enables the polymerization reaction of the polymerizable compound to proceed. In order to easily aggregate and fix the ink composition, the amount of the acid contained in the reaction system is preferably 0.1 parts by mass to 1,000 parts by mass, more preferably 1 part by mass to 500 parts by mass, and even more preferably 10 parts by mass to 300 parts by mass, with respect to a total of 100 parts by mass of the solid components of the ink composition. When the reaction system is an aqueous solution, the pH of the acidic condition is preferably equal to or greater than 1 and less than 7, more preferably equal to or greater than 2 and less than 7, and even more preferably equal to or greater than 3 and less than 7. Examples of the acid include those exemplified as the aforementioned "acidic compound".

<Image Forming>

The formation of an image that is performed by using the aforementioned photopolymerization reaction preferably includes at least an acid treatment step (acid treatment agent providing step) of providing the acid treatment agent, which is a part of the aforementioned ink set, to a recording medium, an ink applying step of applying the ink composition to a predetermined portion on the recording medium so as to form an image portion, and a photopolymerization step (actinic energy ray irradiation step) of polymerizing the polymerizable compound in the formed image portion by irradiating the image with actinic energy rays.

—Recording Medium—

The recording medium used in the image forming method of the present invention is not particularly limited, and it is possible to use general printing paper which is used in general offset printing or the like and mainly composed of cellulose, such as fine paper, coated paper, and art paper. When an image is recorded on the general printing paper, which is mainly composed of cellulose, by a general ink jet method using an aqueous ink, the ink is relatively slowly absorbed into and dried on the paper. Moreover, after the ink droplets are ejected onto the paper, coloring materials easily migrate, and thus the image quality easily deteriorates. However, when the aforementioned ink composition or ink set is used, it is possible to record a high-quality image having excellent color density and color tone by inhibiting the migration of the coloring materials.

As the recording medium, commercially available general recording media can be used. Examples of the recording medium include fine paper (A) such as "OK Prince Fine" manufactured by Oji Paper Co., Ltd., "Shiorai" manufactured by NIPPON PAPER INDUSTRIES CO., LTD., and "New NIP Fine" manufactured by NIPPON PAPER INDUSTRIES CO., LTD., fine coated paper such as "Silverdia" manufactured by NIPPON PAPER INDUSTRIES CO., LTD., lightly coated paper such as "OK Everlight Coat" manufactured by Oji Paper Co., Ltd. and "Aurora S" manufactured by NIPPON PAPER INDUSTRIES CO., LTD., lightweight coated paper (A3) such as "OK Coat L" manufactured by Oji Paper Co., Ltd. and "Aurora L" manufactured by NIPPON PAPER INDUSTRIES CO., LTD., coated paper (A2, B2) such as "OK Topcoat +" manufactured by Oji Paper Co., Ltd. and "Aurora Coat" manufactured by NIPPON PAPER INDUSTRIES CO., LTD., art paper (A1) such as "OK Kinfuji +" manufactured by Oji Paper Co., Ltd. and "Tokubishi Art" manufactured by MITSUIBISHI PAPER MILLS LIMITED, and the like. Furthermore, various dedicated papers for photographs for ink jet recording can also be used.

Among the recording media, so-called coated paper used in general offset printing or the like is preferable. The coated paper is obtained by forming a coat layer on the surface of fine paper or neutral paper, which is mainly composed of cellulose and generally has not undergone surface treatment, by coating the surface thereof with a coating material. When an image is formed on the coated paper by using a general aqueous ink jet, the image quality such as glossiness or abrasion resistance easily becomes problematic. However, when the aforementioned ink composition or ink set is used, glossiness variation is suppressed, and as a result, an image having excellent glossiness and abrasion resistance can be obtained. It is particularly preferable to use coated paper including base paper and a coat layer containing either or both of kaolin and calcium bicarbonate. More specifically, art paper, coated paper lightweight coated paper, and lightly coated paper are more preferable.

A water absorption coefficient Ka of the above recording media is preferably 0.05 mL/m$^2$·ms$^{1/2}$ to 0.5 mL/m$^2$·ms$^{1/2}$, more preferably 0.1 mL/m$^2$·ms$^{1/2}$ to 0.4 mL/m$^2$·ms$^{1/2}$, and even more preferably 0.2 mL/m$^2$·ms$^{1/2}$ to 0.3 mL/m$^2$·ms$^{1/2}$, because within the above range, the effect of inhibiting the migration of coloring materials becomes strong, and a high-quality image is obtained which has excellent color density and color tone better than those of the related art.

The water absorption coefficient Ka has the same definition as the absorption coefficient described in JAPAN TAPPI paper pulp test method No. 51:2000 (published by Japan Tappi.). Specifically, by using an automatic scanning liquid absorptometer KM500Win (manufactured by KUMAGAI RIKI KOGYO Co., Ltd.), the amount of water transferred to a medium is measured under conditions of a contact time of 100 ms and a contact time of 900 ms, and from a difference therebetween, the water absorption coefficient Ka is calculated.

—Acid Treatment Step (Acid Treatment Agent Providing Step)—

In the acid treatment agent providing step, the acid treatment agent containing the acidic compound is provided onto a recording medium. For providing the acid treatment agent (aqueous solution) to the recording medium, a known liquid providing method can be used without particular limitation, and it is possible to select any method such as coating like spray coating or roller coating, a method of providing the acid treatment agent by using an ink jet method, or dipping.

Specifically, examples of the method include a size press method represented by a horizontal size press method, a roll coater method, a calender size press method, or the like; a size press method represented by an air knife coater method or the like; a knife coater method represented by an air knife coater method or the like; a roll coater method represented by a transfer roll coater method such as gate roll coater method, a direct roll coater method, a reverse roll coater method, a squeeze roll coater method, or the like; a building blade coater method; a short dwell coater method; a blade coater method represented by a two stream coater method or the like; a bar coater method represented by a rod bar coater method or the like; a cast coater method; a gravure coater method; a curtain coater method; a die coater method, a brush coater method; a transfer method; and the like.

Furthermore, a coating method may be used in which the coating amount is controlled by using a coating device that includes a liquid amount restricting member just like the coating device described in JP1998-230201A (JP-H10-230291A).

Regarding a region to which the acid treatment agent is provided, the acid treatment agent may be provided to the entire surface of the recording medium such that it is provided to the entirety of the recording medium, or alternatively, the acid treatment agent may be provided partially such that it is provided to a region to which the ink has been provided in the ink applying step. In the present invention, it is preferable to provide the acid treatment agent to the entire surface of the coated paper by means of coating using a coating roller or the like, because in this way, the amount of the acid treatment provided is uniformly adjusted; fine lines, fine image portions, and the like are uniformly recorded; and density variation such as image variation is suppressed.

Examples of the coating method in which the amount of the acid treatment agent provided is controlled to be within the above range include a method using an anilox roller. The anilox roller is a roller of which the surface is coated with a ceramic by thermal spraying and processed with a laser such that a pyramidal shape, a diagonal line, a testudinal shape, or the like is formed thereon. The acid treatment agent flows into concavities formed on the roller surface and is transferred to paper by coming into contact with the surface of paper, and in this way, the paper is coated with the acid treatment agent in a coating amount controlled by the concavities of the anilox roller.

—Ink Applying Step—

In the ink applying step, the ink composition contained in the ink set is provided onto the recording medium. As the method of applying the ink composition, a known ink applying method can be used without particular limitation, as long as the ink composition can be provided in the form of an intended image by the method. For example, it is possible to use a method of applying the ink composition onto the recording medium by means of an ink jet method, a mimeographic method, a transfer printing method, or the like. Among these, from the viewpoint of reducing the size of a recording device and from the viewpoint of high-speed recording properties, the ink applying step is preferably a step of applying the ink composition by an ink jet method.

When an image is formed by an ink jet method, by the supply of energy, the ink composition is ejected onto a recording medium, and a colored image is formed. As an ink jet recording method preferable in the present invention, the methods described in paragraphs 0093 to 0105 of JP2003-306623A can be used.

The ink jet method is not particularly limited. For example, the ink jet method may be any of a charge controlling method in which an ink is ejected by using electrostatic attraction force; a drop-on-demand method (a pressure pulse method) using vibration pressure of a piezo-electric element; an acoustic ink jet method in which an ink is ejected by using an acoustic beam (radiation pressure) converted from an electric signal; and the like.

Furthermore, an ink jet head used in the ink jet method may be an on-demand type or a continuous type. In addition, an ink nozzle or the like used at the time of performing recording by the ink jet method is not particularly limited, and can be appropriately selected according to the purpose.

The ink jet method includes a method ejecting a large number of inks with low density called photo ink in a small volume, a method of improving image quality by using a plurality of inks which have substantially the same color and different density, and a method of using a colorless and transparent ink.

The ink jet method also includes a shuttle method of using a short serial head (short head), in which recording is performed while a recording medium is being scanned in a width direction by the serial head, and a line method using a line head in which recording elements corresponding to the entire region of one side of a recording medium are arranged. In the line method, the recording medium is scanned in a direction orthogonal to the arrangement direction of the recording elements, and accordingly, an image can be recorded on the entire surface of the recording medium, and a transport system such as a carriage scanning the short head is not required. Moreover, complicated scanning control for moving a carriage and a recording medium is not required, and only the recording medium is moved. Therefore, the recording speed in the line method can be increased to more than that in the shuttle method.

In the present invention, the acid treatment agent providing step and the ink applying step can be performed in any order without particular limitation. However, from the viewpoint of image quality, an embodiment is preferable in which the ink applying step is performed after the acid treatment agent providing step. That is, the ink applying step is preferably a step of applying the ink composition onto the recording medium to which the acid treatment agent has been provided.

—Photopolymerization Step (Actinic Energy Ray Irradiation Step)—

The formation of an image preferably includes a photopolymerization step of irradiating the ink composition provided onto the recording medium with actinic energy rays. By the irradiation with actinic energy rays, the polymerizable compound contained in the ink composition is polymerized, and a cured film containing a colorant is formed. In this way, abrasion resistance and blocking resistance of the image are more effectively improved.

When the ink composition provided onto the recording medium is irradiated with actinic energy rays, the polymerizable compound in the ink composition is polymerized. This is because the polymerization initiator of the present invention contained in the ink composition turns into a radical by the irradiation with actinic energy rays, and a polymerization reaction of the polymerizable compound is initiated and accelerated from the radical as a starting point.

In the present invention, as the actinic energy rays, α rays, γ rays, electron beams, X rays, ultraviolet rays, visible light, infrared light, and the like can be used. It is preferable that the photopolymerization initiator used in the present invention highly absorbs the light of an ultraviolet region, and in view of this, a wavelength of the actinic energy rays is preferably 200 nm to 600 nm, more preferably 300 nm to 450 nm, and even more preferably 350 nm to 420 nm.

The power of the actinic energy rays is preferably equal to or less than 5,000 mJ/cm$^2$, more preferably 10 mJ/cm$^2$ to 4,000 mJ/cm$^2$, and even more preferably 20 mJ/cm$^2$ to 3,000 mJ/cm$^2$.

As a source of the actinic energy rays, a mercury lamp, a gas laser, a solid-state laser, or the like is mainly used. As light sources used for curing an ultraviolet photocurable ink for ink jet recording, for example, a mercury lamp, a metal halide lamp, a light emitting diode (LED), and a laser diode (LD) are widely known.

[Ink Drying Step]

If necessary, the formation of an image may include an ink drying step of drying and removing a solvent (for example, water, a water-soluble organic solvent, or the like) in the ink composition provided onto the recording medium. The ink drying step is not particularly limited as long as at least a portion of the ink solvent can be removed, and a generally used method can be used in the step.

EXAMPLES

Hereinafter, the present invention will be more specifically described based on examples, but the present invention is not limited to the examples.

[Preparation of Polymerizable Compound]

Polymerizable Compound

M-1

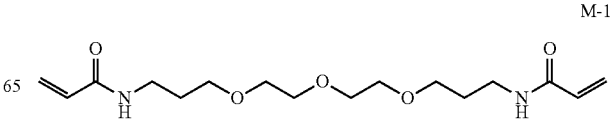

M-2

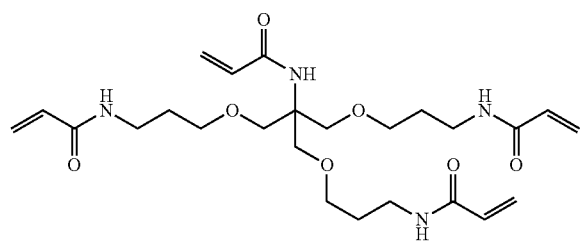

[Synthesis of Polymerizable Compound M-1]

40.0 g (182 mmol) of 4,7,10-trioxy-1,13-tridecanediamine, 37.8 g (450 mmol) of sodium hydrogen carbonate, 100 g of water, and 200 g of tetrahydrofuran were put into a three-neck flask having a volume of 1 L equipped with a stirrer, and then 35.2 g (389 mmol) of acrylic acid chloride was added dropwise thereto for 20 minutes in an ice bath. The solution obtained after the dropwise addition was stirred for 5 hours at room temperature, and then tetrahydrofuran was removed by distillation from the obtained reaction mixture under reduced pressure. Thereafter, an aqueous layer was extracted four times by using 200 ml of ethyl acetate, the obtained organic layer was dried over magnesium sulfate and then filtered, and the solvent was removed by distillation under reduced pressure. As a result, 35.0 g (107 mmol, yield of 59%) of a solid as a target polymerizable compound M-1 was obtained.

[Synthesis of Polymerizable Compound M-2]

According to the following scheme, a polymerizable compound M-2 was synthesized.

Scheme 2

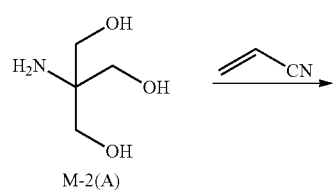

M-2(A)

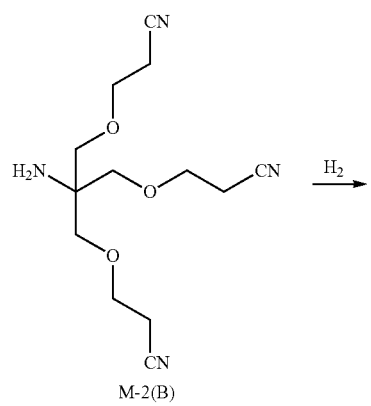

M-2(B)

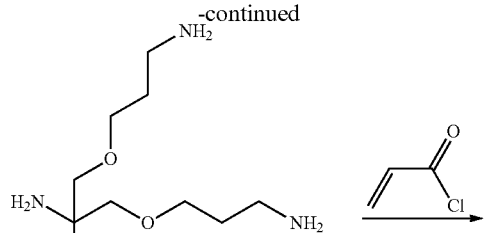

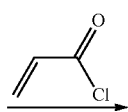

M-2(C)

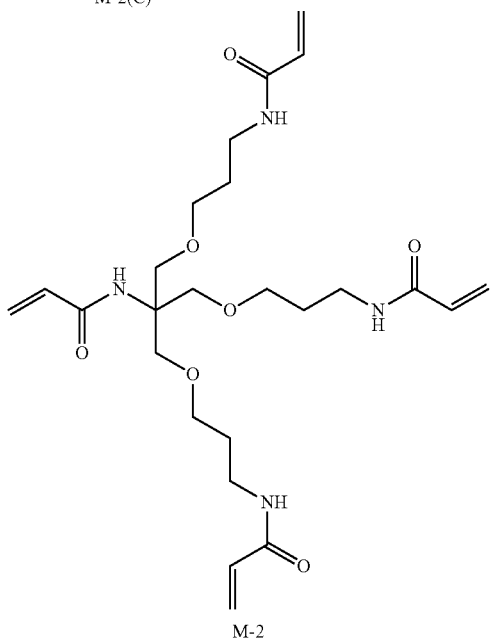

M-2

(1) Synthesis of Intermediate M-2 (B)

121 g (1 equivalent) of tris(hydroxymethyl)aminomethane M-2 (A) (manufactured by Tokyo Chemical Industry Co., Ltd.), 84 ml of 50% aqueous potassium hydroxide solution, and 423 ml of toluene were put into a three-neck flask having a volume of 1 L equipped with a stirrer bar and were stirred. Thereafter, the temperature of the reaction in situ was kept at 20° C. to 25° C. in a water bath, and in this state, 397.5 g (7.5 equivalents) of acrylonitrile was added thereto over 2 hours. The solution obtained after the dropwise addition was stirred for 1.5 hours, 540 ml of toluene was then added to the reaction mixture, and the reaction mixture was moved to a separating funnel, thereby removing an aqueous layer. The remaining organic layer was dried over magnesium sulfate, filtered through Celite, and the solvent was removed by distillation under reduced pressure. As a result, an intermediate M-2 (B) as an acrylonitrile adduct was obtained. The analysis results of the obtained compound that were obtained by $^1$H-NMR and MS agreed well with the results of known compound. Therefore, the obtained compound was used in the following reduction reaction without being further purified.

(2) Synthesis of Intermediate M-2 (C)

24 g of the intermediate M-2 (B) obtained as above, 48 g of a Ni catalyst (Raney Nickel 2400 manufactured by W. R.

Grace & Co.), and 600 ml of a solution of 25% aqueous ammonia:methanol=1:1 were put and suspended in an autoclave having a volume of 1 L, and the reaction container was sealed. Then, hydrogen at 10 MPa was introduced into the reaction container, and a reaction was performed for 16 hours at a reaction temperature of 25° C.

The state in which the raw materials had disappeared was confirmed by $^1$H-NMR, the reaction mixture was filtered through Celite, and the Celite was washed several times with methanol. The solvent was removed from the filtrate by distillation under reduced pressure, thereby obtaining an intermediate M-2 (C) as an amine compound. The obtained compound was used in the following reduction reaction without being further purified.

(3) Synthesis of Polymerizable Compound M-2

30 g of the intermediate M-2 (C) obtained as above, 120 g (14 equivalents) of NaHCO$_3$, 1 L of dichloromethane, and 50 ml of water were put into a three-neck flask having a volume of 2 L equipped with a stirrer, and then 92.8 g (10 equivalents) of acrylic acid chloride was added dropwise thereto over 3 hours in an ice bath. Subsequently, the resultant was stirred for 3 hours at room temperature. After the state in which the raw materials had disappeared was confirmed by $^1$H-NMR, the solvent was removed from the reaction mixture by distillation under reduced pressure. The reaction mixture was then dried over magnesium sulfate, filtered through Celite, and the Celite was washed with 100 mL of dichloromethane, and the solvent was removed from the filtrate by distillation under reduced pressure. Finally, the resultant was purified by column chromatography (ethyl acetate/methanol=4:1), thereby obtaining yellow liquid (yield of 40%) at room temperature.

[Preparation of Photopolymerization Initiator]

The following photopolymerization initiators I-1 to I-4 were prepared.

The photopolymerization initiator I-1 was purchased from BASF Japan Ltd. The photopolymerization initiator I-2 was synthesized by a known method (the method described in U.S. Pat. No. 4,861,916). The photopolymerization initiator I-3 was synthesized with reference to a known method (the method described in JP1983-79991A (JP-S58-79991A)). The photopolymerization initiator I-4 was synthesized with reference to a known method (the method described in Chemistry of Materials 1998, Vol. 10, p. 3429-3433).

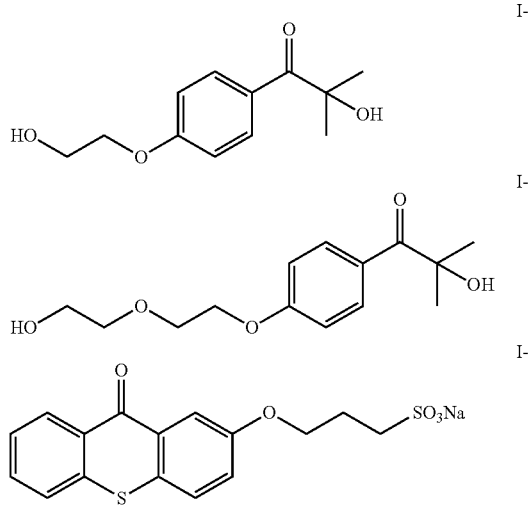

I-1

I-2

I-3

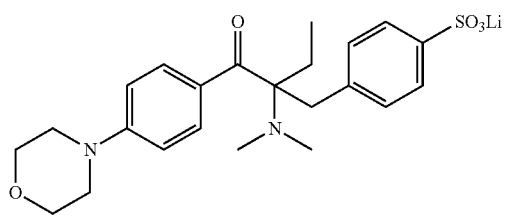

I-4

[Chain Transfer Agent Precursor]

The following chain transfer agent precursors A-1 to A-4 were prepared.

All of the chain transfer agent precursors A-1 to A-4 were synthesized by reacting a mercapto compound of A-1 to A-4, which was a starting material purchased from Tokyo Chemical Industry Co., Ltd., with equimolar sodium hydroxide or potassium hydroxide in water.

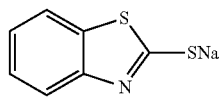

A-1

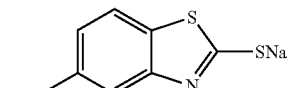

A-2

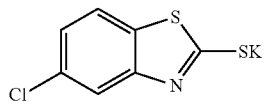

A-3

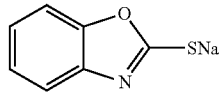

A-4

Example 1

An ink set was prepared in the following manner, an image was formed by an ink jet method, and a test for curability was performed.

[Synthesis of Polymer Dispersant P-1]

88 g of methyl ethyl ketone was put into a three-neck flask having a volume of 1,000 ml equipped with a stirrer and a condenser and heated to 72° C. in a nitrogen atmosphere. To the resultant, a solution, which was obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone, was added dropwise over 3 hours. After the dropwise addition ended, the resultant was further reacted for 1 hour, a solution, which was obtained by dissolving 0.42 g of dimethyl 2,2'-azobisisobutyrate in 2 g of methyl ethyl ketone, was added thereto, and the resultant was heated to 78° C. for 4 hours. The obtained reaction solution was reprecipitated twice in a large excess of hexane, and the precipitated resin was dried, thereby obtaining 96 g of a polymer dispersant P-1.

The composition of the obtained resin was confirmed by $^1$H-NMR. Furthermore, a weight average molecular weight (Mw) of the resin measured by gel permeation chromatography (GPC) was 44,600. Moreover, as a result of measuring an acid value thereof by the method described in JIS standard (JIS K 0070:1992), an acid value of 65.2 mgKOH/g was obtained.

[Preparation of Dispersion of Pigment Covered with Resin]

—Dispersion of Magenta Pigment Covered with Resin—

10 parts by mass of Chromophthal Jet Magenta DMQ (Pigment Red 122 manufactured by BASF Japan Ltd.), 5 parts by mass of the polymer dispersant P-1, 42 parts by mass of methyl ethyl ketone, 5.5 parts by mass of an aqueous NaOH solution at 1 mol/L, and 87.2 parts by mass of deionized water were mixed together and dispersed for 2 to 6 hours by using 0.1 mmϕ zirconia beads by means of a beads mill, thereby obtaining a dispersion.

From the obtained dispersion, methyl ethyl ketone was removed at 55° C. under reduced pressure, and then a portion of water was also removed, thereby obtaining a dispersion (coloring particles) of a magenta pigment covered with a resin that had a pigment concentration of 40% by mass.

[Preparation of Ink Sets 1 to 18]

Magenta inks 1 to 17 were prepared in the following manner according to the following ink formulations 1 to 17. Furthermore, an acid treatment agent 1 was prepared according to the following formulation. Ink sets 1 to 17 composed of a combination of each of the magenta inks 1 to 17 and the acid treatment agent 1 were obtained.

(Preparation of Magenta Inks 1 to 17)

The aforementioned dispersion of a magenta pigment covered with a resin, deionized water, a photopolymerization initiator, a polymerizable compound, and a surfactant were mixed together according to the following ink formulations 1 to 17, and then the mixture was filtered through a 5 μm membrane filter, thereby preparing magenta inks 1 to 17.

[Ink Formulation]
—Ink Formulation 1—

| | |
|---|---|
| Dispersion of magenta pigment covered with resin | 15% by mass |
| Photopolymerization initiator I-1 | 1.5% by mass |
| Chain transfer agent precursor A-1 | 1.5% by mass |
| Polymerizable compound M-1 | 15% by mass |
| Olfine E1010 (manufactured by Nissin Chemical Co., Ltd.; surfactant) | 1% by mass |
| Deionized water | added such that the total amount of the mixture became 100% by mass |

—Ink Formulations 2 to 4—

The ink formulations 2 to 4 were the same as the ink formulation 1, except that the photopolymerization initiator I-1 in the ink formulation 1 was replaced with each of the photopolymerization initiators I-2 to I-4.

—Ink Formulations 5 to 7—

Ink formulations 5 to 7 were the same as the ink formulation 1, except that the chain transfer agent precursor A-1 in the ink formulation 1 was replaced with each of the chain transfer agent precursors A-2 to A-4.

—Ink Formulation 8—

The ink formulation 8 was the same as the ink formulation 1, except that the polymerizable compound M-1 in the ink formulation 1 was replaced with the polymerizable compound M-2.

—Ink Formulation 9—

| | |
|---|---|
| Dispersion of magenta pigment covered with | 15% by mass |
| Photopolymerization initiator I-2 | 1.5% by mass |
| Chain transfer agent precursor A-1 | 1.5% by mass |
| Triisopropanolamine | 1.5% by mass |
| Polymerizable compound M-1 | 15% by mass |
| Olfine E1010 (manufactured by Nissin Chemical Co., Ltd.; surfactant) | 1% by mass |
| Deionized water | added such that the total amount of the mixture became 100% by mass |

—Ink Formulation 10—

The ink formulation 10 was the same as the ink formulation 9, except that triisopropanolamine in the ink formulation 9 was replaced with triethanolamine.

—Ink Formulation 11—

The ink formulation 11 was the same as the ink formulation 9, except that triisopropanolamine in the ink formulation 9 was replaced with N-methyldiethanolamine.

—Ink Formulations 12 to 15 (Comparative Ink Formulations)—

The ink formulations 12 to 15 were the same as the ink formulations 1 to 4, except that the chain transfer agent precursors A-1 to A-4 in the ink formulations 1 to 4 were not added.

—Ink Formulations 16 and 17 (Comparative Ink Formulations)—

The ink formulations 16 and 17 were the same as the ink formulations 1 and 5, except that the chain transfer agent precursors A-1 and A-2 in the ink formulations 1 and 5 were replaced with 2-mercaptobenzothiazole (manufactured by Wako Pure Chemical Industries, Ltd.) and 2-mercapto-5-methoxybenzothiazole (manufactured by Tokyo Chemical Industry Co., Ltd.) respectively. However, the pigment was aggregated immediately after the ink was prepared, and thus the curability of ink formulations 16 and 17 could not be tested and evaluated.

By using a pH meter WM-50EG (manufactured by DKK-TOA CORPORATION), the pH (25° C.) of the magenta inks 1 to 15 was measured. As a result, it was confirmed that the pH value was within a range of 8.6 to 8.8 in all of the magenta inks.

(Preparation of Acid Treatment Agent)

By mixing the following materials together, an acid treatment agent 1 was prepared. By using the aforementioned pH meter, the pH (25° C.) of the acid treatment agent 1 was measured. As a result, it was confirmed that the pH thereof was 1.0.

—Composition of Acid Treatment Agent 1—

| | |
|---|---|
| Malonic acid | 25.0% by mass |
| Tripropylene glycol monomethyl ether (water-soluble organic solvent) | 5.0% by mass |
| Deionized water | 70.0% by mass |

[Preparation of Ink Set 18]

An ink set 18 composed of only with the magenta ink 1 without the acid treatment agent 1 was prepared.

[Ink Jet Recording]

As a recording medium (coated paper), Tokubishi Art double-sided N sheet (manufactured by MITSUIBISHI PAPER MILLS LIMITED, a basis weight of 104.7 g/m$^2$) was prepared. An image was formed on the recording medium as below, and the formed image was evaluated as below.

By using the ink sets 1 to 15 and 18 prepared as above, a line image and a solid image were formed by four-color single pass recording.

At this time, the ink composition was ejected in a main scanning direction by a single pass so as to form a line having a width of one dot at 1,200 dpi, a line having a width of two dots at 1,200 dpi, and a line having a width of four dots at 1,200 dpi, thereby forming the line image.

The solid image was formed by ejecting the ink composition to the entire surface of the recording medium (sample) cut into A5 size. The images were formed under the following conditions.

Herein, the following sections (1) and (2) are steps performed only for the ink sets 1 to 15.

(1) Acid Treatment Agent Providing Step

For the ink sets 1 to 15, the entire surface of the recording medium was coated with the acid treatment agent 1 by a roll coater in which the coating amount was controlled by an anilox roller (number of lines: 100 lines/inch to 300 lines/inch), such that the acid treatment agent 1 was provided in an amount of 1.4 g/m².

(2) Drying/Permeation Step

Thereafter, on the recording medium coated with the acid treatment agent, drying treatment and permeation treatment were performed under the following conditions.

Wind speed: 10 m/s

Temperature: By a contact-type planar heater, the recording medium was heated from the side (rear side) opposite to the recording surface of the recording medium, such that the surface temperature on the side of the recording surface of the recording medium became 60° C.

(3) Ink Applying Step

Under the following conditions, the ink of the ink sets 1 to 15 was ejected by an ink jet method to the surface (the side of the recording surface) of the recording medium coated with the acid treatment agent, and the ink of the ink set 18 was ejected by an ink jet method to the recording surface of the recording medium, thereby forming the line image and the solid image respectively.

Head: Piezoelectric full-line heads of 1,200 dpi/20 inch width for four colors were arranged.
Amount of droplets ejected: 2.0 pL
Driving frequency: 30 kHz (4) Ink Drying Step The recording medium to which the ink was provided was dried under the following conditions.

Drying method: air blow drying
Wind speed: 15 m/s
Temperature: By a contact-type planar heater, the recording medium was heated from the side (rear side) opposite to the recording surface of the recording medium, such that the surface temperature on the side of the recording surface of the recording medium became 60° C.

(5) Fixing Step

Subsequently, by using a metal halide lamp, the recorded image was irradiated with ultraviolet rays as actinic energy rays under an energy condition of 800 mJ/cm², thereby obtaining an image sample.

[Evaluation]

Each of the obtained image samples was subjected to the following test for curability of ink, thereby evaluating the curability.

—Test for Curability—

Tokubishi Art double-sided N sheet (manufactured by MITSUIBISHI PAPER MILLS LIMITED.) on which nothing was printed was wound around a paperweight (a mass of 470 g, a size of 15 mm×30 mm×120 mm) (a contact area between Tokubishi Art double-sided N sheet, on which nothing was printed, and the evaluation sample was 150 mm²), and the aforementioned printed sample was rubbed back and forth three times against the recording medium. After the rubbing, the image was visually observed and evaluated according to the following evaluation criteria.

(Evaluation criteria)

AA . . . Peeling of the image (coloring material) portion could not be visually observed within the printing surface.

A . . . Slight peeling of the image (coloring material) portion was observed within the printing surface (a level unproblematic for practical use).

B . . . Partial peeling of the image (coloring material) portion could be visually observed within the printing surface (a level not preferable for practical use).

C . . . The ink was practically not cured, and peeling of the image (coloring material) portion could be visually observed throughout a wide area of the printing surface.

The obtained results are shown in the following Table 1.

TABLE 1

| Ink set | Photopolymerization initiator | Chain transfer agent precursor | Trialkylamine | Acid treatment agent | Polymerizable compound | Evaluation of curability | Notes |
|---|---|---|---|---|---|---|---|
| 1 | I-1 | A-1 | Not contained | Contained | M-1 | A | Present invention |
| 2 | I-2 | A-1 | Not contained | Contained | M-1 | A | Present invention |
| 3 | I-3 | A-1 | Not contained | Contained | M-1 | A | Present invention |
| 4 | I-4 | A-1 | Not contained | Contained | M-1 | A | Present invention |
| 5 | I-1 | A-2 | Not contained | Contained | M-1 | A | Present invention |
| 6 | I-1 | A-3 | Not contained | Contained | M-1 | A | Present invention |
| 7 | I-1 | A-4 | Not contained | Contained | M-1 | A | Present invention |
| 8 | I-1 | A-1 | Not contained | Contained | M-2 | A | Present invention |
| 9 | I-2 | A-1 | Triisopropanolamine | Contained | M-1 | AA | Present invention |
| 10 | I-2 | A-1 | Triethanolamine | Contained | M-1 | AA | Present invention |
| 11 | I-2 | A-1 | N-methyldiethanolamine | Contained | M-1 | AA | Present invention |
| 12 | I-1 | Not contained | Not contained | Contained | M-1 | B | Comparative example |
| 13 | I-2 | Not contained | Not contained | Contained | M-1 | B | Comparative example |
| 14 | I-3 | Not contained | Not contained | Contained | M-1 | C | Comparative example |
| 15 | I-4 | Not contained | Not contained | Contained | M-1 | C | Comparative example |

TABLE 1-continued

| Ink set | Photopolymerization initiator | Chain transfer agent precursor | Trialkylamine | Acid treatment agent | Polymerizable compound | Evaluation of curability | Notes |
|---|---|---|---|---|---|---|---|
| 18 | I-1 | A-1 | Not contained | Not contained | M-1 | B | Comparative example |

As shown in Table 1, the images (the line image and the solid image) formed by using the ink prepared according to the formulation not including the chain transfer agent precursor yielded results showing poor curability (poor photopolymerization efficiency) (ink sets 12 to 15). Furthermore, even when the ink contained the chain transfer agent precursor, if the photopolymerization reaction was not performed under an acidic condition, results showing poor curability were obtained (ink set 18).

In contrast, all of the images formed by using the ink sets 1 to 11 of the present invention had excellent curability and fastness. It was also found that when trialkylamine was mixed with the ink, the curability (fastness) were further improved (ink sets 9 to 11).

The above results clearly show that the ink composition and the ink set of the present invention are particularly suited for forming an image by an ink jet method.

What is claimed is:

1. An ink composition comprising the following (A) to (D) and (F):
    (A) a polymerizable compound having an ethylenically unsaturated group;
    (B) a photopolymerization initiator other than a photopolymerization initiator having a biimidazole structure;
    (C) water;
    (D) a chain transfer agent precursor represented by the following Formula (1); and
    (F) a trialkylamine,

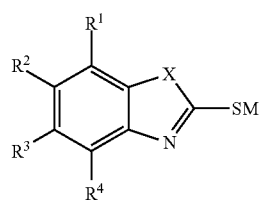

Formula (1)

wherein the (B) photopolymerization initiator is an aromatic ketone compound, and in Formula (1), each of $R^1$ to $R^4$ represents a hydrogen atom or a substituent, the any one of $R^1$ to $R^4$ is an electron withdrawing group; X represents an oxygen atom or a sulfur atom; and M represents an alkali metal.

2. The ink composition according to claim 1, wherein the (A) polymerizable compound having the ethylenically unsaturated group is a (meth)acrylamide compound having two or more (meth)acrylamide groups.

3. The ink composition according to claim 1, further comprising:
    (E) a colorant.

4. An ink set comprising:
    the ink composition according to claim 1; and
    an acid treatment agent containing an acidic compound.

5. The ink set according to claim 4,
    wherein the acidic compound is an acid which has a molecular weight of 50 or greater to 200 or less and a pKa of 1 or greater to 5 or less in water with a temperature of 25° C.

6. An image forming method comprising:
    providing an acid treatment agent containing an acidic compound onto a recording medium;
    applying the ink composition according to claim 1 onto the recording medium having provided the acidic compound to form an image; and
    polymerizing a polymerizable compound in the image by irradiating the image with actinic energy rays.

7. The ink composition according to claim 1,
    wherein the pH of the ink composition is 7 to 10.

* * * * *